Figure 1:
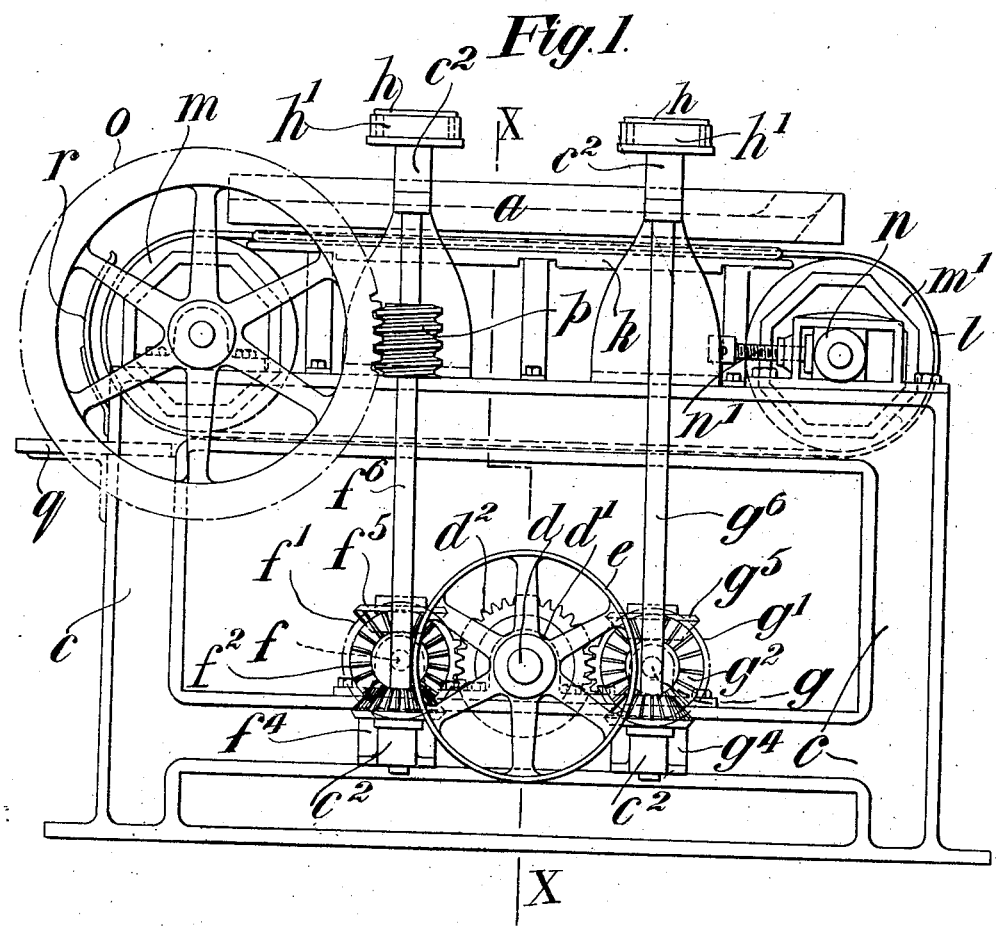

W. SCOTT & M. RICHARD.
MACHINE FOR HANDING UP OR ROLLING DOUGH.
APPLICATION FILED JAN. 15, 1907.

925,235.

Patented June 15, 1909.
3 SHEETS—SHEET 1.

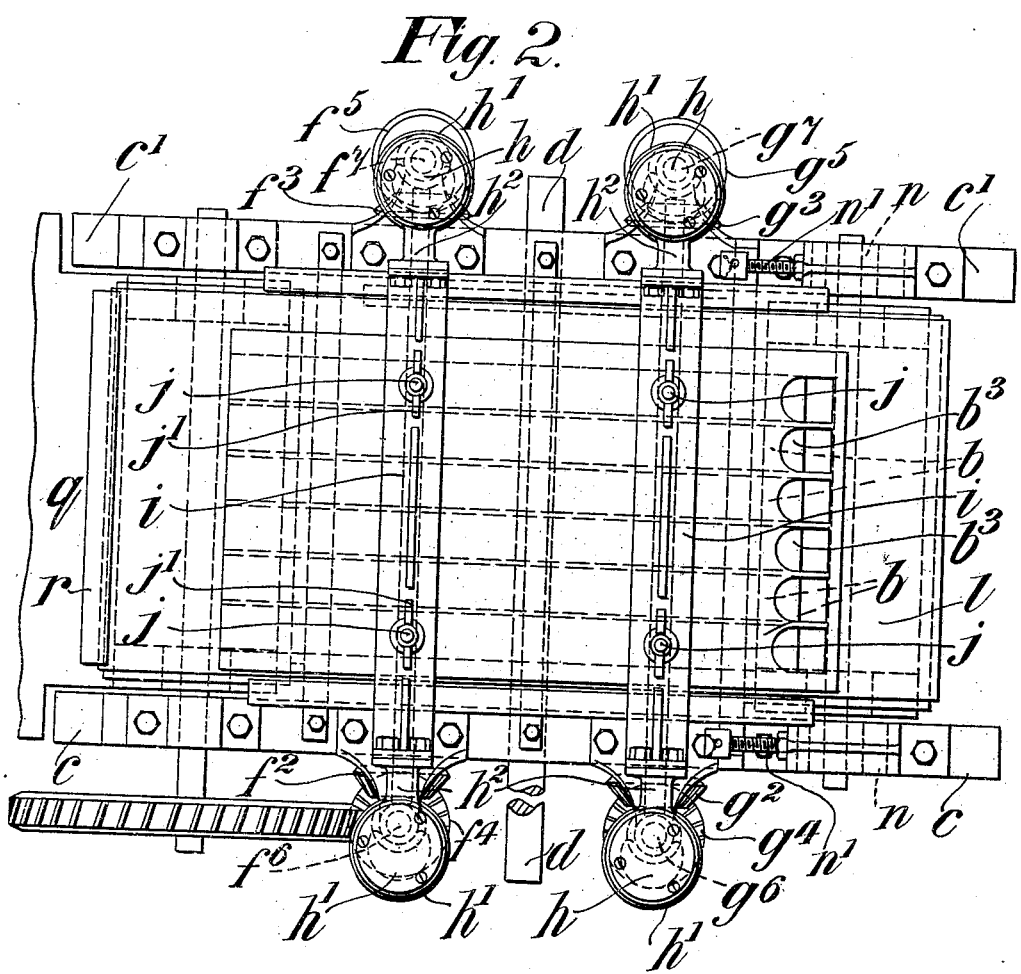

W. SCOTT & M. RICHARD.
MACHINE FOR HANDING UP OR ROLLING DOUGH.
APPLICATION FILED JAN. 15, 1907.
925,235.
Patented June 15, 1909.
3 SHEETS—SHEET 3.
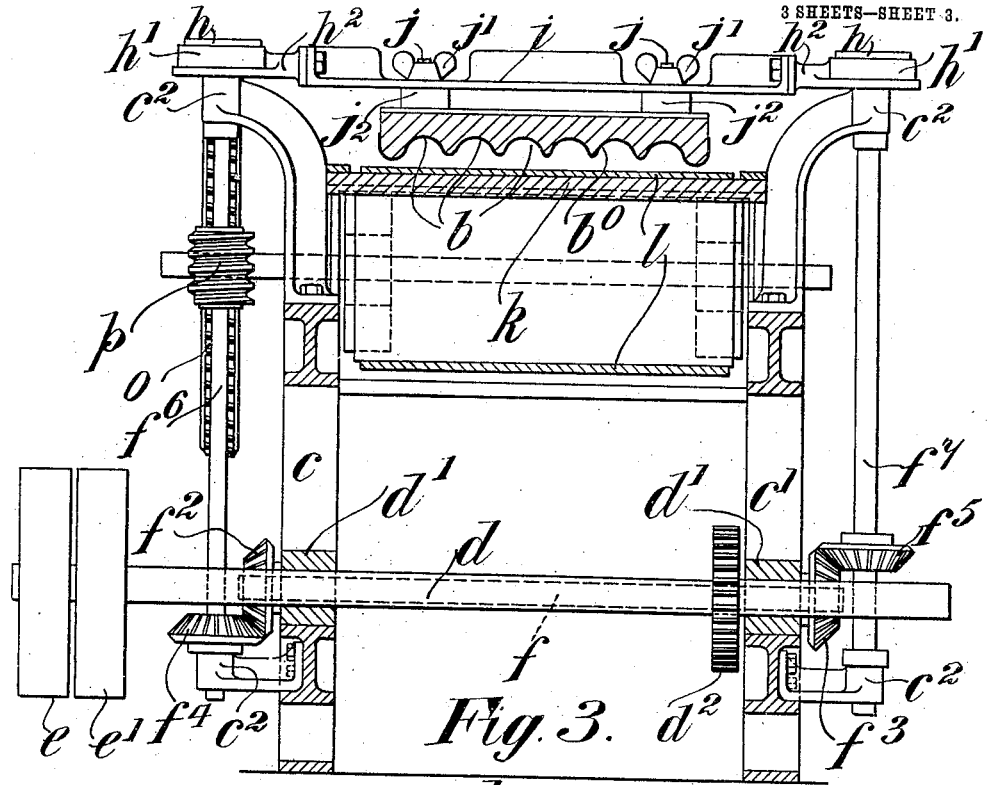
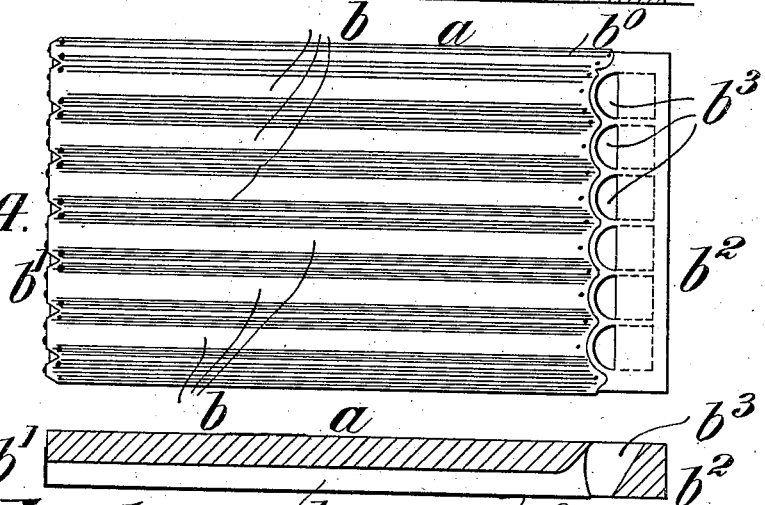
Witnesses:
P. F. Nagle
L. Danville
Inventors
William Scott
Murdoch Richard
By Wiedersheim & Fairbanks
Attorneys

A
UNITED STATES PATENT OFFICE.

WILLIAM SCOTT AND MURDOCH RICHARD, OF GLASGOW, SCOTLAND.

MACHINE FOR HANDING UP OR ROLLING DOUGH.

No. 925,235.    Specification of Letters Patent.    Patented June 15, 1909.

Application filed January 15, 1907. Serial No. 352,387.

*To all whom it may concern:*

Be it known that we, WILLIAM SCOTT, engineer, and MURDOCH RICHARD, baker, subjects of the King of Great Britain, both residing at 12 McNeil street, Glasgow, Scotland, have invented an Improved Machine for Handing Up or Rolling Dough, of which the following is a specification.

This invention relates to a machine for "handing up" or rolling dough in the manufacture of loaves, etc. of the class wherein the dough is molded by being given a combined forward and lateral rolling action over an endless band.

The machine is so made that it imitates hand rolling and performs the operation very efficiently.

In carrying out the invention we use a "hander up" preferably made of an inverted trough shape and of semi-circular cross section. This "hander up" which may be made of any suitable material and of any desired length, is open at both ends and is adjustably suspended over an endless traveling band by means of links or equivalent carried by an overhead framework. The trough is moved longitudinally and laterally preferably by means of an eccentric or pin and disk or crank arrangement connected with and arranged above it and to which motion is imparted by a shaft (or shafts) driven by belt pulleys or otherwise. The dough is delivered direct to the "hander up". The endless band runs over rollers and is driven by power. As the "hander up" works, it rolls the dough on the band, in a somewhat similar manner to hand rolling with the result that very good loaves etc. can be made. While the lumps are being rolled the band carries them along from end to end of the trough. The lumps of rolled dough can finally be carried away by the endless band, or otherwise, as found most convenient. Preferably we conduct them by the band, under a mold board which presses them into shape. The endless band is preferably made of felt.

In order that our said invention may be clearly understood we have hereunto appended explanatory drawings which show the construction of the machine.

Figure 1 is a side elevation of the machine. Fig. 2 is a plan view of the same. Fig. 3 is a cross section taken on the line X, X, Fig. 1. Fig. 4 is an underside or inverted plan view and Fig. 5 is a longitudinal section of the "hander up".

In carrying out the invention we use a "hander up" $a$ preferably made in the shape of a single inverted trough or of a series of inverted troughs $b$ of semi-circular cross section.

On the drawings we have shown a hander-up with six troughs $b$ therein one alongside the other. Each trough or channel $b$ is open at its delivery end $b^1$ and at its feed end $b^2$ which latter end is preferably made with an upwardly inclined passage in which the dough may be placed so as to run down the incline on to the band $l$.

The hander up may be made of wood or other suitable material and the inclined passage leading to each trough as well as the trough itself may be lined with felt or the like $b^0$ to prevent the dough adhering to the wood.

The "hander up" $a$ is carried by a suitable frame, preferably built up with two open side cheeks $c$, $c^1$, carrying bearing blocks $d^1$ for the driving shaft $d$ to which fast and loose pulleys $e$, $e^1$, are fitted. Arranged parallel to the driving shaft $d$ and on each side thereof are two shafts $f$, $g$, fitted with spur wheels $f^1$, $g^1$, which gear with and are driven by the spur wheel $d^2$ on the driving shaft. The shafts $f$, $g$, pass right through the machine and have fitted on their ends bevel wheels $f^2$, $f^3$, $g^2$, $g^3$, which gear with and drive four bevel wheels $f^4$, $f^5$, $g^4$, $g^5$, on four vertical shafts $f^6$, $f^7$, $g^6$, $g^7$, carried in bearing brackets $c^2$ at the outside of the machine. Fitted on the upper end of each of these vertical shafts is an eccentric $h$ whose strap $h^1$ is made with an extension $h^2$ to which is bolted, one end of a cross bar $i$. There are two cross bars arranged so as to connect together the eccentric straps $h^1$ facing each other at opposite sides of the machine.

The hander up is suspended from two cross bars by means of bolts and wing nuts $j$, $j^1$ with removable distance pieces $j^2$. By changing the distance pieces *i. e.*, using thicker or thinner ones and raising and lowering the screws $j$ by means of the nuts, the hander up $b$ can be adjusted vertically to suit the work. Fitted just below the hander up is a table or board $k$ and arranged so as to pass along the upper surface of this board $k$ is an endless traveling canvas band $l$ which runs over the rollers $m$, $m^1$, the following roller $m^1$ having its shaft fitted in adjustable bearings $n$ which can be adjusted by means of the screws $n^1$ so as to tension or tighten up the band $l$ as desired. The shaft of the driving roller $m$ is provided with a worm wheel $o$ which bears with and is driven by a worm $p$ on the vertical shaft $f^6$. The delivery end of the machine is fitted with a table $q$ and mold board $r$ which latter is curved around concentrically with the roller $m$ and serves to flatten out the lumps of dough as they pass from the hander up.

With this machine the lumps of dough are delivered direct to the under side of the hander up through the inclined feed passages $b^3$. As the machine works the "hander up" is moved longitudinally and laterally by means of the eccentrics $h$ and as a consequence it is caused to roll the dough on the band $l$ as the latter travels over the table or board $k$ the action being somewhat similar to hand rolling. At the same time as the lumps of dough are being rolled the traveling band $l$ carries them along from end to end of the troughs $b$ of the hander up.

The lumps of rolled dough are carried away on the traveling band $l$ and passed beneath the mold board $r$ which press them into a flattened shape, and from thence on to the table $q$ from which they can be removed by hand or by means of another traveling band or otherwise.

Of course although we have shown a machine with a hander up having a series of troughs or channels $b$ it may be made with only one or two troughs. The more troughs there are the more dough can be simultaneously rolled or "handed up" to use the common trade expression.

Having now fully described our invention what we claim and desire to secure by Letters Patent is:—

1. A machine for rolling dough, comprising in combination, a traveling band, means for operating the same, a non-yielding device arranged above the band for rolling the lumps of dough as they are moved forward by said band, positive means for actuating said device, means for adjustably and removably suspending said device from said actuating means and spacing devices coöperating with the suspension means.

2. In a machine for rolling dough, a traveling band, means for actuating the same, a non-yielding device arranged above the band for rolling the lumps of dough as they are moved forward by said band, cross bars from which said device is suspended, spacing devices coöperating with the suspension means for automatically moving said cross bars and the said device longitudinally and laterally during the forward movement of the band.

3. In a machine for rolling dough, a traveling band, means for actuating the same, a non-yielding device arranged above the band for rolling the lumps of dough as they are moved forward by said band, cross bars from which said device is suspended, means for automatically moving said cross bars and the said device longitudinally and laterally during the forward movement of the band, the suspending means of said device being provided with removable spacing devices.

4. In a machine for rolling dough, an endless traveling belt, rollers for supporting and moving the same, means for driving one of said rollers, a non-yielding device arranged above the belt for rolling the lumps of dough as they are moved forward by said belt, suspension means for said device, means for automatically moving the same and said device longitudinally and laterally during the forward movement of the belt, and spacing devices coöperating with said suspension means.

5. In a machine for rolling dough, an endless traveling belt, rollers for supporting and moving the same, means for driving one of said rollers, cross bars above said belt, vertical means coöperating with the belt driving means for giving said cross bars a longitudinal and lateral movement, and a corrugated device adjustably suspended from said cross bars over said belt, spacing devices coöperating with the suspending means said device being provided at one end with inclined feed passages communicating with the longitudinal corrugations thereof.

6. In a machine for rolling dough, the combination of a movable platform, a device adjustably arranged above the platform for rolling the lumps of dough as they are moved forward by said platform, suspension means for said device, spacing devices coöperating with said suspension means means for operating said platform and dough rolling device, and a stationary curved mold board at the end of the platform for flattening the lumps of dough on the platform before they leave the machine.

In testimony whereof we affix our signatures in presence of two witnesses.

WM. SCOTT.
MURDOCH RICHARD.

Witnesses:
WILLIAM FLEMING,
WILLIAM GALL.